Oct. 10, 1950 V. E. ACKLES 2,525,164
ICING APPLYING MACHINE
Filed Dec. 11, 1946 2 Sheets-Sheet 1
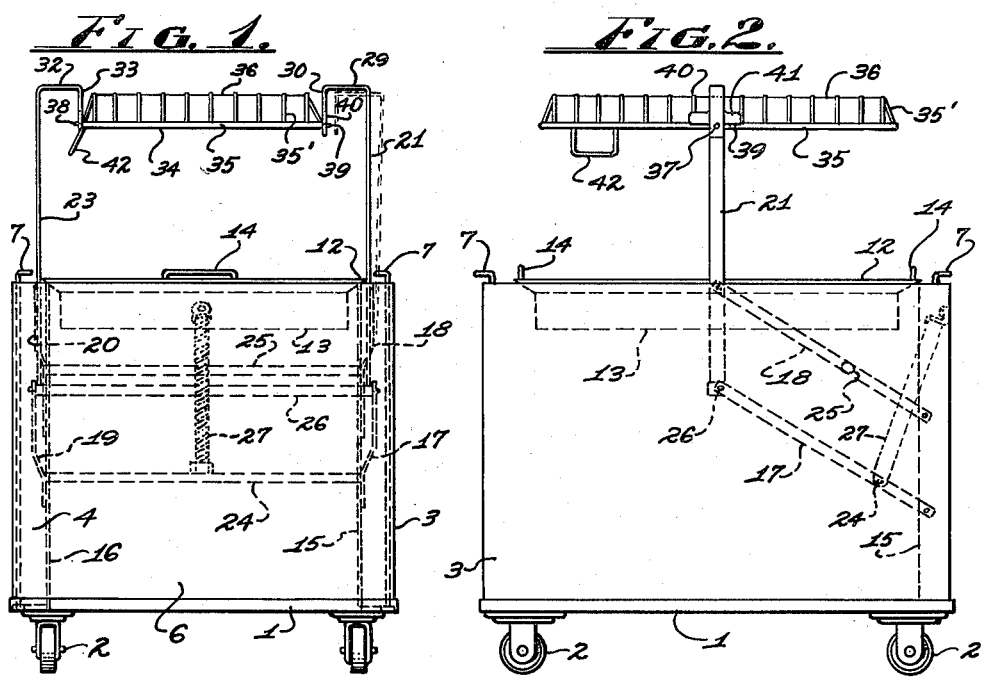
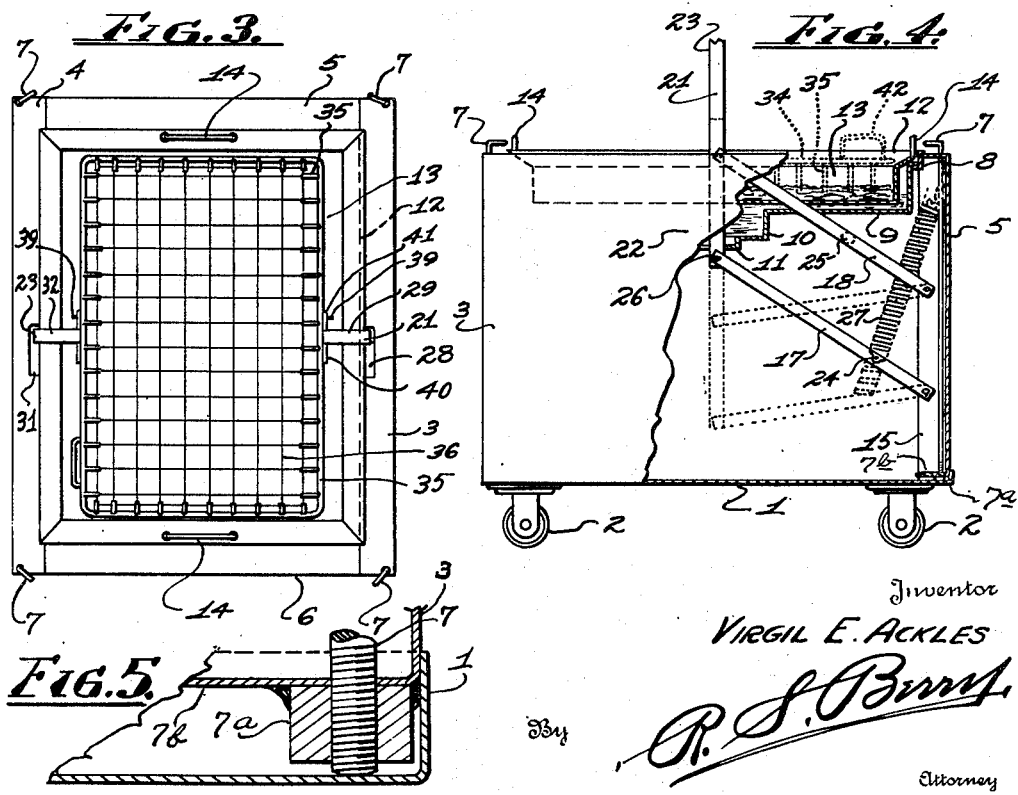
Inventor
VIRGIL E. ACKLES
By R. S. Burt
Attorney

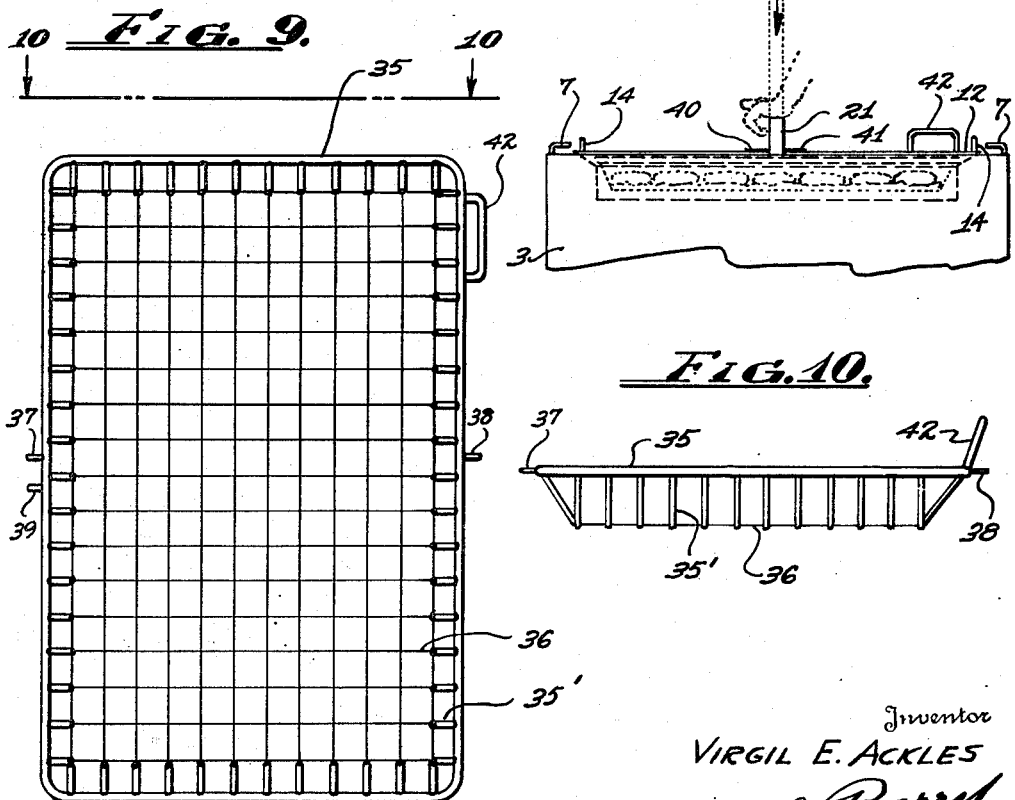

Patented Oct. 10, 1950

2,525,164

UNITED STATES PATENT OFFICE 2,525,164

ICING APPLYING MACHINE

Virgil E. Ackles, Los Angeles, Calif., assignor to Doughnut Corporation of America, New York, N. Y., a corporation of New York Application December 11, 1946, Serial No. 715,382

5 Claims. (Cl. 91—4)

This invention relates to devices for applying icing to doughnuts, cakes, rolls and other bakery products and particularly to a machine which is adapted to operate on a wide variety of such products without change. Since its greatest use is in the manufacture of doughnuts, it will be described in that use, but it will be apparent to those skilled in the art that it may as readily be employed in the icing of other products and therefore any use of the term doughnuts in the following specification will be understood to be by way of description only and does not imply any intention of limitation of the invention.

It is an object of the invention to provide a machine for icing doughnuts and other bakery products which may be attended by a single operative and which is so constructed and arranged that the products being iced are not touched by the operator.

A further object of the invention is to provide an icing machine or apparatus which is so constructed and arranged that a quantity of doughnuts or the like may be placed in the machine, iced and removed as a unit.

A still further object of the invention is to provide a machine of the above character in which leveling means are provided so that a quantity of doughnuts being iced simultaneously will be treated to the same extent.

Still another object of the invention is to provide a machine of the above character which is simple and sturdy in construction, easy to keep clean (a major consideration where food products are concerned) and simple and reliable in operation.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is an end elevation of a representative form of machine embodying the principles of the invention, Fig. 2 is a side elevation, Fig. 3 is a top plan view, Fig. 4 is a view similar to Fig. 2 but omitting the doughnut holding tray and having the side partially broken away to show details of interior construction, Fig. 5 is an enlarged fragmentary view to show one of the leveling devices in detail, Figs. 6, 7 and 8 are fragmentary views showing different steps in an icing operation, Figs. 9 and 10 are top plan and side views respectively of the doughnut holding rack employed as a component part of the machine.

Referring first to Figs. 1 to 5, inclusive, the form of the machine disclosed comprises a base member 1 mounted on a set of casters 2 to render the machine portable. Mounted on the base 1 is a hollow rectangular frame work of sheet metal comprising side members 3 and 4 and end members 5 and 6. Extending upwardly from the base 1 through each end of each side member is a series of adjusting or leveling screws 7 employed for a purpose to be later described in detail. As clearly shown in the drawings, these screws at their upper ends are bent laterally to provide handles whereby they may be turned.

Referring to Fig. 5, the lower end of each leveling screw is threaded into a nut 7a welded or otherwise secured to a laterally extending flange 7b formed by the inturned lower edges of the side members 3 and 4 and the end of the screw bears against the base plate 1. Consequently, turning the screws 7 will effect a raising or lowering of the corners of the frame structure whereby it may be leveled to accommodate any unevenness in the floor. The frame work structure on its inner periphery slightly below the upper edge thereof is provided with a ledge 8 on which the peripheral out-turned flange of a water pan 9 is supported. The water pan is relatively shallow except at its center part which is offset to provide a slightly deeper portion 10. Fixed to the underside of the pan beneath the portion 10 is a compartment 11 in which an electric heating element is housed. In those installations in which electricity is not available, other types of heating devices such as gas burners or steam coils may be provided, it being essential to the invention only that some form of heat be applied to the water pan.

Resting on the top of the frame structure is the flared top 12 of a rectangular icing pan 13 spaced from the side walls and bottom of the water pan 9 as most clearly shown in Fig. 4. During operation the heat applied to the water by the heating means applies the heat to the icing pan and the icing contained therein, whereby, it is maintained sufficiently soft for application to doughnuts and the like as will be hereinafter more fully described. The added depth of the water pan at its center causes the heat from the heating means to be evenly applied to the icing in the icing pan. To aid in removing and replacing the icing pan it is provided at either end with handles 14, 14. Furthermore, the abutment of the flanged top 12 of the icing pan with the open top of the frame structure prevents any drippings of icing from getting into the interior of the water pan or other parts of the machine.

In the form of the invention here shown, the frame structure at one end thereof is provided with a pair of vertically disposed, inwardly extending flanges 15 and 16 adjacent the inner faces of the side walls 3 and 4 respectively. Pivotally connected at spaced points on the flange 15 is one end of a pair of arms 17 and 18 and pivoted to the flange 16 at points horizontally opposite the arms 17 and 18 is one end of a pair of arms 19 and 20. The arms 17 and 18 at their free ends are pivoted to the lower end of a vertically disposed rack support 21 and since the arms 17 and 18 are of the same length and since the pivotal connections to the flange 15 and to the rack support are the same distance apart a true parallel rule movement is achieved and upon movement of the arms the rack support 21 will remain vertical while moving along a curved path generally indicated by the dotted line 22 in Fig. 4. The free ends of the arms 19 and 20 are similarly pivotally connected to the lower end of a second rack supporting member 23 and since the dimensions are the same the two rack supporting members will move in identical paths. A spacer 24 interconnects the arms 17 and 19 intermediate their ends, while a spacer 25 similarly interconnects the arms 18 and 20 intermediate their ends. Additionally a spacer 26 interconnects the arms 17 and 19 and the lower ends of the rack supports 21 and 23 at the pivot points thereof. A tension spring 27 fixed at one end to the upper portion of the frame structure is connected to the spacer 24 midway of its length and tends normally to hold the arms and rack supports raised up as indicated in Figs. 1 to 4.

The rack support 21 extends upwardly through a slot 28 in the upper inner face of the side member 3 and normally extends a considerable distance above the frame structure. At its upper end it is bent laterally inwardly at 29 for a distance sufficient to overhang the interior of the icing pan 13 and thence extends downwardly at 30 for a short distance. Likewise, the rack support 23 extends upwardly through a slot 31 in the side member 4 for the same distance as the support 21 and thence extends laterally at 32 and downwardly at 33 for the same distance as the end 30 of the support 21.

Pivotally supported by the extremities of rack supports is a rack or tray 34. As best shown in Figs. 9 and 10, the rack comprises a rectangular main frame member 35. Rigidly attached to this frame along its periphery are spaced, downwardly and inwardly inclined wire supports 35' with a series of tightly stretched fine wires 36 extending between the distal ends of opposed supports, the wires at their intersecting points being interwoven to form a large mesh. While as here shown the mesh is square, any other arrangement of tightly stretched fine wires will serve for the bottom of the rack so long as the meshes are smaller than the doughnuts or the like which are to be iced. The main frame at the sides thereof intermediate the ends is provided with opposed laterally extending lugs 37 and 38 which are journalled in bearings in the ends of the down turned portions 30 and 33 of the rack supports as best shown in Fig. 1. To remove or replace the rack it is necessary only to spring one or the other of the supports laterally as shown in dotted lines in Fig. 1 to provide the necessary clearance after which the support thus sprung will return to its normal position. Additionally, spaced slightly from the lug 37 the main frame carries a stop lug 39 adapted to engage one or the other of the stop members 40 and 41 formed as laterally extending integral portions of the depending portion 30 of the rack support 21. The bearing lugs 37 and 38 while directly opposite each other are not directly at the balancing point of the rack but are slightly offset therefrom so that the end of the rack remote from the stop lug 39 is slightly heavier. Consequently, whether the rack is in the inverted or loading and unloading position or is right side up which is the icing position, this slight unbalance will tend to hold it in that position. Additionally, it may be noted that the stop lug 39 is spaced a sufficient distance from the bearing lug 37 so that its path from one stop lug to the other clears the extremity 30 of the rack support.

To put the machine into use and assuming that the water pan and icing pan have been filled and properly heated, the rack is swung to the inverted position shown in Fig. 6. The operator then takes a tray which has been previously loaded with a layer of doughnuts or the like and positions it inside the inverted rack and holds it there with one hand, and while so holding it takes hold of the rack handle 42 with the other hand and swings the rack and tray in a clockwise direction as viewed in Fig. 6 to the upright position as shown in Fig. 7 in which position the stop lug 39 engages the stop member 40. Then the operator grasps the lateral portion of the rack support 20 and presses downwardly on it moving both the rack supports and the rack downwardly evenly due to the interconnection of the supporting arms 17, 18, 19 and 20. The spring 27 is of only sufficient strength to hold a loaded rack in the upper position so that little manual effort is required for this downward movement. The extent of movement must be sufficient of course to permit the aforesaid swinging movement of the rack to clear the upper surface of the icing when the rack is in its uppermost position.

The downward movement of the rack continues until the wires 36 forming the bottom thereof come into contact with the icing and move through it leaving the doughnuts floating thereon (see Fig. 8). Due to the small size of the wires this does not require a great deal of effort even though a relatively stiff icing be employed. If necessary, at this time the operator may apply some manual pressure to the tray, which is now on top of the doughnuts, to force them slightly further into the icing according to the character of the icing and the extent to which it is to be applied. Then the spring 27 is allowed, with some help by the operator, to move the rack to the upper position as in Fig. 7. The unbalance of the tray before mentioned is helpful at this time also since the drag of the icing on the rack and the doughnuts as they separate from it is resisted by the engagement of the stop lug 99 with the member 40. The rack and its load is then permitted to rest a few seconds to allow surplus icing to drip back into the icing pan, then the operator holding the tray against the bottom of the rack inverts the rack and removes the iced tray of doughnuts and places the tray on a suitable rack for cooling and hardening of the icing.

Thus there has been created a machine for icing doughnuts and other bakery products characterized by simple, fool-proof and economical construction, which is easy to operate, does not require a skilled operator, is easy to keep clean and which is capable of high production. In the latter connection, a tray containing four dozen doughnuts may be processed in about 10 seconds. Further, when it is desired to change from one kind of icing to another as from chocolate to a sugar icing it is necessary only to change icing pans, each machine being supplied with two or more interchangeable pans for that purpose.

Still further the machine may be employed for different products without change since it will handle a tray of crullers or rolls, for example, as readily as a tray of doughnuts. Again since the wires 36 forming the bottom of the rack are small, when a processed tray is removed therefrom the semi-fluid icing will flow together to form a smooth surface, obliterating any marks left by the wires.

As before explained the rack is readily removable for cleaning by springing one or the other of the rack supports laterally and due to its novel construction it may be readily cleaned. Otherwise the only cleaning ordinarily necessary is the smooth top surface of the frame structure surrounding the icing pan.

It is particularly to be noted that the entire icing operation is carried out above the icing pan and that therefore there is no possibility of the icing dripping on the floor around the machine. This has the advantages of contributing to the ease of keeping the floor in a safe and sanitary condition and of preventing the waste of icing.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In an icing machine embodying a frame structure, an icing pan carried by said frame structure, a pair of rack supports mounted for down and up movement on said frame structure, yieldable means normally holding said rack supports in their raised position, and a rack pivotally mounted on said rack supports above said icing pan for manual turning; a stop lug on said rack projecting from a side thereof adjacent to but spaced from the pivotal mounting thereof, and a pair of oppositely extending stop members carried by said rack support projecting into the path of travel of said stop lug on turning said rack; one of said stop members being engageable by said stop lug to limit turning movement of said rack to a horizontal inverted position and the other of said stop members being engageable by said stop lug to limit turning movement of said rack to a horizontal upright position; said rack being pivoted in offset relation to a balancing point so that one end thereof is heavier than the other whereby the rack will be normally held in either of its positions.

2. In an icing machine embodying a frame structure, an icing pan carried by said frame structure, a pair of rack supports mounted for down and up movement on said frame structure, and yieldable means normally holding said rack supports in their raised position; a rack pivotally mounted on said rack supports above said icing pan for manual turning, a stop lug on said rack projecting from a side thereof adjacent to and spaced from its pivotal mounting, and a pair of oppositely extending stop members carried by at least one of said rack supports projecting into the path of travel of said stop lug on turning said rack, one of said stop members being engageable by said stop lug to limit turning movement of said rack to a horizontal inverted position and the other of said stop members being engageable by said stop lug to limit turning movement of said rack to a horizontal upright position.

3. In an icing machine embodying a frame structure and an icing pan carried thereby; a pair of parallel reciprocal vertically disposed rack supports arranged one adjacent each of opposed sides of said icing pan and extending above and below the latter, a pair of parallel vertically swinging arms connecting the lower portions of each of said rack supports to said frame structure, a spacer bar connecting at least one of said pair of arms to one of the arms of the other pair, a spring connected at one end to said frame structure above the highestmost position said spacer bar may assume and at its other end to said spacer bar exerting an upward pull on the latter tending to normally hold the arms and rack support in an elevated position, and an invertible rack pivotally supported on the upper end portions of said rack supports and extending therebetween.

4. In an icing machine embodying a frame structure and an icing pan carried thereby; a pair of parallel reciprocal vertically disposed rack supports, arranged one adjacent each of opposed sides of said icing pan, and extending above and below the latter, a pair of parallel vertically swinging arms connecting the lower portions of each of said rack supports to said frame structure, a spacer bar connecting at least one of said pair of arms to one of the arms of the other pair, a spring connected at one end to said frame structure above the highestmost position said spacer bar may assume and at its other end to said spacer bar exerting an upward pull on the latter tending to normally hold the arms and rack support in an elevated position, bearings on the upper end portions of said rack supports, a rack extending between said rack supports, lugs on opposed sides of said rack pivotally engaged in said bearings, said rack supports being moveable relative to each other at the upper end portions thereof to separate said bearings from said lugs and free said rack from said rack supports.

5. In an icing machine embodying a frame structure, an icing pan carried by said structure, and a pair of parallel vertically reciprocal rack supports mounted on said structure and extending above said icing pan; a rack extending between the upper portions of said rack supports above said icing pan; said rack supports having inwardly extending downturned upper end portions, bearings adjacent the ends of said downturned portions below said stop members, bearing lugs on opposed sides of said rack pivoted in said bearings, a stop lug projecting laterally from said rack spaced relative to one of said bearing lugs a distance exceeding that between said bearing lugs and the end of the adjacent downturned portion of the contiguous rack support, and laterally projecting stop members on opposed edges of said downturned portion arranged in the path of said stop lug to limit turning of said rack in either direction to a horizontally extending position.

VIRGIL E. ACKLES.

REFERENCES CITED

The following references are of record in the file of this patent:

UNITED STATES PATENTS

| Number | Name | Date |
|---|---|---|
| 719,896 | Spang | Feb. 3, 1903 |
| 750,076 | Annen | Jan. 19, 1904 |
| 859,509 | McDonald | July 9, 1907 |
| 875,189 | Kunitz | Dec. 31, 1907 |
| 1,486,683 | Plumridge | Mar. 11, 1924 |
| 2,222,390 | Ackles | Nov. 19, 1940 |
| 2,373,721 | Taylor | Apr. 17, 1945 |